United States Patent [19]

Symmons

[11] Patent Number: 4,457,452

[45] Date of Patent: Jul. 3, 1984

[54] AUTOMATIC SHUT-OFF VALVE

[75] Inventor: Paul C. Symmons, Wellesley, Mass.

[73] Assignee: Symmons Industries, Inc., Braintree, Mass.

[21] Appl. No.: 381,147

[22] Filed: May 24, 1982

[51] Int. Cl.³ .................. B67D 5/30; F16K 11/18
[52] U.S. Cl. ........................... 222/20; 137/636.4; 251/15
[58] Field of Search ............... 251/15, 51, 54; 137/625.17, 625.4, 625.41, 636.4; 222/14, 16, 17, 20

[56] References Cited

U.S. PATENT DOCUMENTS

| | | | |
|---|---|---|---|
| 3,342,448 | 9/1967 | Parkison | 251/51 |
| 3,430,820 | 3/1969 | Winters et al. | 137/636.4 X |
| 3,870,080 | 3/1975 | Landwehr | 137/625.17 X |
| 3,933,337 | 1/1976 | Morris et al. | 251/54 |
| 4,093,177 | 6/1978 | Morris et al. | 251/54 |
| 4,241,759 | 12/1980 | Billeter | 251/51 X |

FOREIGN PATENT DOCUMENTS

3005280 8/1981 Fed. Rep. of Germany ........ 251/15

Primary Examiner—Joseph J. Rolla
Assistant Examiner—Kevin P. Shaver
Attorney, Agent, or Firm—Schiller & Pandiscio

[57] ABSTRACT

An improved automatic shut-off valve that allows the temperature of discharged water to be adjusted by rotating the valve operating handle. The means for shutting off the discharge of water is simplified by attaching a valve closure member directly to a piston which is pushed downward manually to initiate flow and then forced upward by a spring to seat the valve closure member and stop the water flow. The piston moves axially inside a piston cylinder that has a hole in its bottom, and a pin connected to the piston sits in the hole. The clearance between the hole and pin determines the rate at which water can flow into the cylinder, thereby controlling the rate at which the piston is returned to its normally shut position by the spring.

24 Claims, 18 Drawing Figures

AUTOMATIC SHUT-OFF VALVE

This invention relates to manually activated flow control valves that automatically shut off after a predetermined time interval has elapsed. More particularly, it relates to automatic shut-off valves which permit adjustment of the water temperature.

PRIOR ART

Manually activated flow control valves that automatically shut off after a preset interval are well known. Valves of this type normally utilize some type of dashpot arrangement connected to an axially displaceable valve stem. The stem is usually biased toward the shut position by a spring which pushes against the dashpot mechanism, and the movement of the dashpot mechanism is normally controlled by a liquid flowing through an orifice in a piston. The piston usually sits in a dashpot chamber, and the orifice allows communications between the volumes of the chamber on either side of the piston Examples of this type of valve are found in U.S. Pat. Nos. 4,093,177 and 3,933,337 and in the references cited therein. Other designs of automatic shut-off valves that also disclose means for controlling the discharged water temperature are exemplified in U.S. Pat. No. 4,241,759.

One problem common to prior art valves of the type described is plugging of the orifice over a period of time due to scale buildup or deposits of debris in the water, since the water being controlled also normally serves as the control liquid in the dashpot mechanism. Another problem in some prior art valves of this sort is that excessive force is required to initiate the valve discharge cycle. A further problem is that water discharge will continue as long as the handle is kept depressed.

Still another problem with some of these prior art valves is that the temperature of the water discharged from the valve cannot be effectively controlled. Some prior art valves of this type require excessive maintenance of the dashpot mechanism or other valve components. Another problem is that the maintenance of some of these prior art valves requires a high degree of skill due to the complexity of the valve components or due to the difficulty of assembling/disassembling the valves.

OBJECTS OF THE INVENTION

Accordingly, the primary object of this invention is to provide an improved automatic shut-off valve which has the capability of regulating the mixed water temperature and eliminates, or substantially reduces, the problems noted above.

Another object is to provide an automatic shut-off valve whose closure rate is controlled by passage of water through an orifice that provides communication between the dashpot chamber volume below the piston and the space below the dashpot mechanism, with a pin positioned in the orifice to provide the desired degree of flow restriction.

Other objects are to provide an automatic shutoff valve which (a) allows the temperature of the discharged water to be easily regulated, (b) requires minimal maintenance, (c) can be assembled and disassembled with relative ease, (d) may be adapted to shut off automatically even when the operating handle is kept depressed, and (e) can be made at a relatively low cost.

SUMMARY OF THE INVENTION

Attainment of the goals listed above is achieved by an improved automatic shut-off valve which, at least in its preferred embodiment, comprises a core member, a piston cylinder coaxial with the core member, connected upper and lower valve bodies surrounding the core member and piston cylinder, means for controlling the flow of water through the valve, and means for regulating the temperature of discharged water.

In the preferred embodiment of the invention, the means for controlling water flow includes a valve seat, a piston inside the piston cylinder, a valve closure member attached to the top of the piston, a spring biasing the piston upward so as to press the closure member against the valve seat and thereby maintain the valve in a normally-shut condition, and a hole through the bottom of the piston cylinder to allow water to enter the space below the piston as the piston is restored to its normally-shut position from the open position by the force of the spring. A pin makes a loose fit in this hole (approximately 0.001 inch clearance) so as to regulate the rate at which water can flow through the hole, thereby controlling the rate of movement of the piston and the length of time the valve remains in the open position. The valve is manually opened by depressing a valve operating handle which is connected to a valve stem that is coaxial with the valve closure member. When the valve stem is pushed down, it makes contact with the valve closure member and pushes it down, along with the piston.

In the preferred embodiment of the invention, the temperature control means comprises a mixing valve member which is integral with the piston cylinder, hot water and cold water supply orifices located adjacent to the mixing valve member, and connecting means between the valve operating handle and the mixing valve member arranged so that when the handle is rotated, the mixing valve member is also rotated, thereby allowing the mixing valve member to restrict the hot and cold water supply orifices more or less and thereby regulate the temperature of the discharged water. As an optional feature, the valve may be adapted to permit it to shut off automatically even though the handle is kept depressed. Still other features of the invention are set forth in or rendered obvious by the following description of a preferred embodiment of the invention which is to be considered together with the drawings.

THE DRAWINGS

In the drawings, like numbers refer to like objects.

Figure 1:
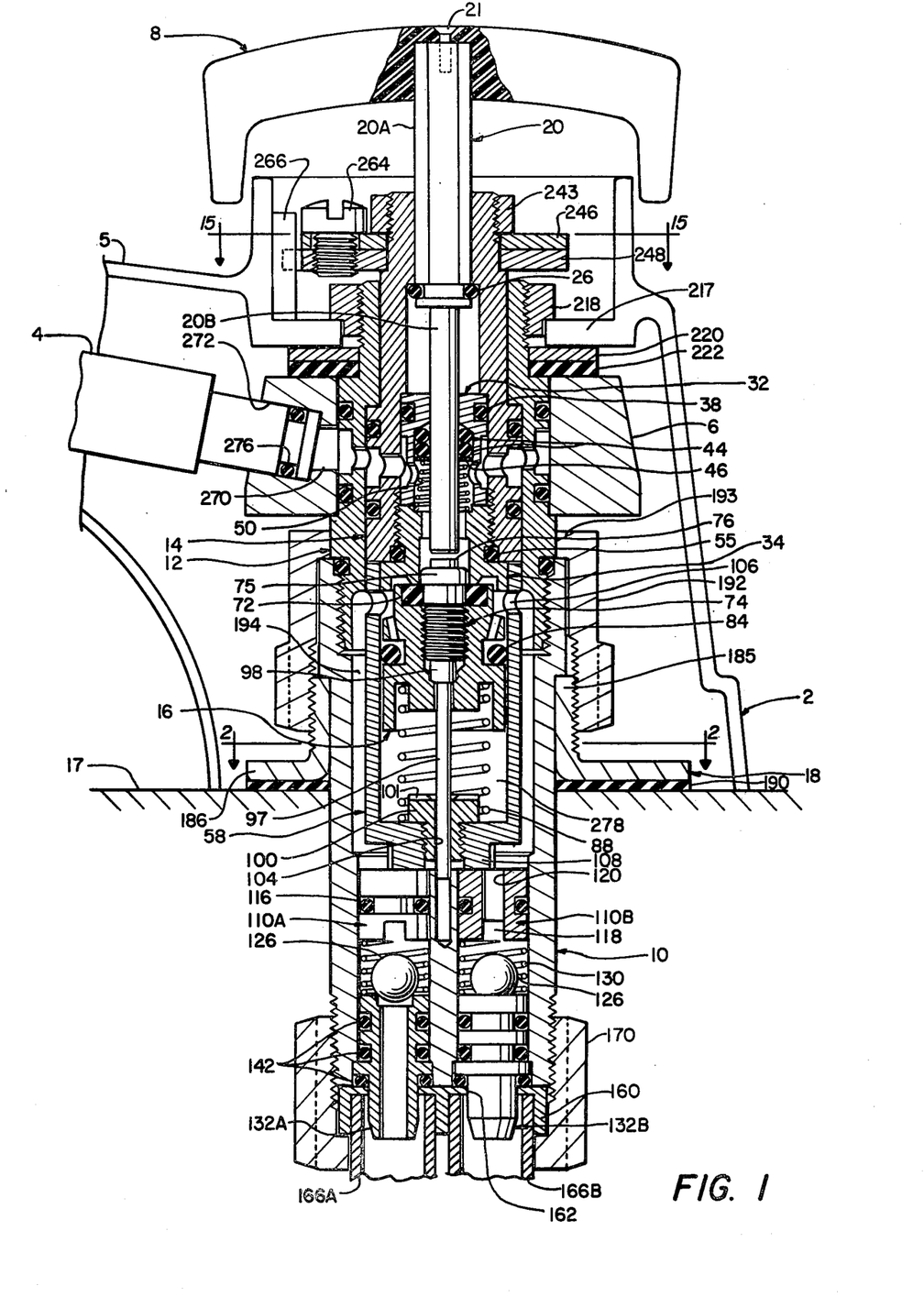
FIG. 1 is a sectional view in side elevation of an automatic shut-off valve constructed in accordance with this invention, the drawing also including fragmentary sectional views of a faucet spout connected to the shut-off valve and a lavatory faucet body surrounding and connected to the shut-off valve.

Turning first to FIG. 1, the illustrated apparatus comprises a lavatory faucet casing 2 surrounding an automatic shut-off valve unit constructed in accordance with this invention and a faucet spout 4. The outer end (not shown) of spout 4 is connected to a discharge passage (not shown) in the outer end (not shown) of casing spout section 5. The inner end of spout 4 is attached by a spout connector 6 to the shut-off valve unit. The shut-off valve unit comprises an operating handle 8, a lower valve body 10 (see also FIGS. 11 and 12), an upper valve body 12 (FIGS. 13 and 14), a core member 14 (FIGS. 7 and 9), a piston 16 (FIG. 6), a stem guide 32 (FIG. 3), a valve seat member 34 (FIGS. 4 and 5), a valve closure/piston assembly comprising a piston cylinder 58 (FIGS. 7 and 8) and a rubber closure washer 72, and various other components described hereinafter. As described hereinafter, the valve unit is mounted to the upper surface of a section 17 of a lavatory sink by a valve support member 18.

Operating handle 8 is attached to an operating stem assembly 20 (comprising an upper section 20A and an integral lower section 20B) by a screw 21, as shown in FIG. 1. Upper section 20A has a six-sided cross-sectional configuration (see FIG. 15) and extends through a correspondingly shaped opening 22 (FIG. 9) in the upper end of the core member 14, whereby a connection is provided which permits the stem assembly to slide axially, but not to rotate, relative to core member 14. The upper stem section 20A has an annular groove near its lower end which accommodates a resilient O-ring 26. The lower valve stem section 20B is circular in cross-section and projects into, and makes a close sliding fit with the round hole 41 in stem guide 32. Valve stem section 20B extends into valve seat member 34.

Figures 2, 3, 4, 5, 6, 7, 8:
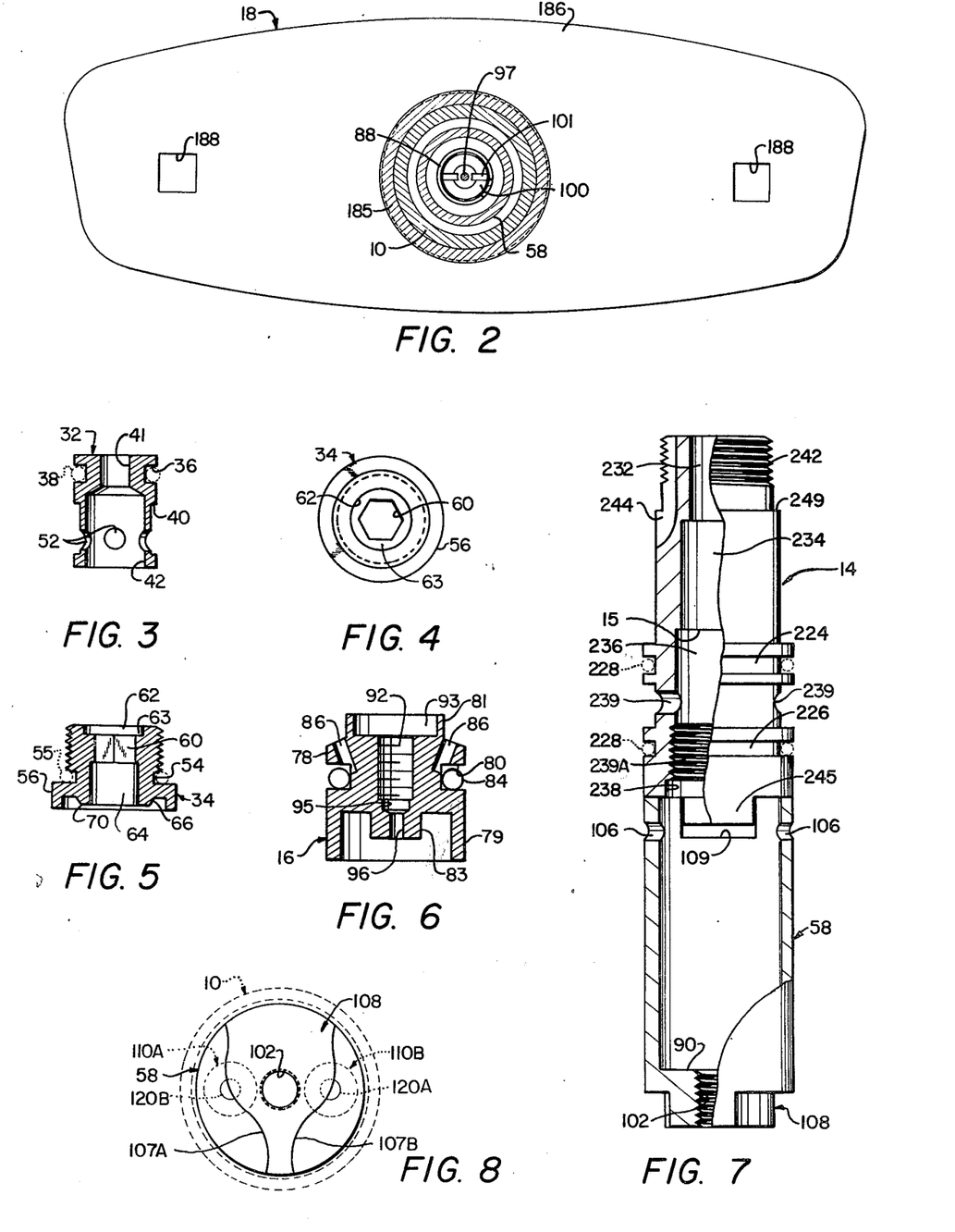
FIG. 2 is a cross-sectional view of the same valve taken along line 2—2 of FIG. 1.
FIG. 3 is a sectional view in side elevation of the upper stem guide of the same valve.
FIG. 4 is a top plan view of the valve seat member of the same valve.
FIG. 5 is a sectional view in side elevation of the same valve seat member.
FIG. 6 is a sectional view in side elevation of the piston of the same valve.
FIG. 7 is a side elevation, partly in section, of the core member and piston cylinder of the same valve.
FIG. 8 is a bottom elevational view of the piston cylinder.

As seen in FIGS. 1 and 3, stem guide 32 is positioned in core member 14 and has a cylindrical shape with an annular groove 36 near its upper end that accommodates a resilient O-ring 38. A second annular groove 40 is located below groove 36 and has a width (the dimension extending along the stem guide axis) several times greater than groove 36. Stem guide 32 also has a cylindrical bore 41 sized to make a close sliding fit with valve stem section 20B, and also a cylindrical counterbore 42. Two resilient O-rings 44 and a stiff washer 46 are positioned in counterbore 42 (FIG. 1). The O-rings 44 and washer 46 are biased upward by an upper compression spring 50 (FIG. 1) which surrounds stem section 20B and is engaged with a shoulder 63 on the upper end of valve seat member 34. Stem guide 32 has four side outlets 52 connecting annular groove 40 and counterbore 42. Stem guide 32 engages a shoulder 15 on core member 14 (FIGS. 1 and 7) and the top end of valve seat member 34 (FIG. 1).

Valve seat member 34 is disposed within core member 14 and, as shown in FIGS. 1, 4, and 5, valve seat member 34 has an annular groove 54 in its outer surface to accommodate an O-ring 55. The outside surface of member 34 above the annular groove 54 is threaded so as to mate with a tapped bore 236 (FIG. 7) in the bottom end of core member 14. Still referring to FIGS. 4 and 5, the lower portion of valve seat member 34 has an enlarged annular flange 56 which is sized to make a close fit in the top of a piston cylinder 58 which is located directly below core member 14. Valve seat member 34 has a hexagonal bore 60 terminating in two cylindrical counterbores 62 and 64. Shoulder 63 is formed between bores 60 and 62. As seen in FIG. 5, the lower end of the portion of valve seat member 34 inside flange 56 terminates in an annular projection 66 which has a flat surface 70 that serves as the valve seat of the automatic shut-off valve unit.

Referring now to FIGS. 1 and 6, the valve closure/piston assembly is located below valve seat member 34 and comprises a rubber closure washer 72, a closure retaining member 74 and piston 16. Retaining member 74 has a threaded lower section, which is screwed into the upper end of piston 16, and a cylindrical upper section, which fits within washer 72. Member 74 also has a flange 75 that makes a sliding fit in counterbore 64 in the lower end of valve seat member 34. The top end 76 of retaining member 74 has a reduced diameter and a flat circular surface. Flange 75 is bevelled at its top edge to facilitate its entry into counterbore 64. Closure washer 72 makes a snug fit in a counterbore 93 (FIG. 6) in the upper end of piston 16 and is held in place by flange 75. Washer 72 is sized so that it will engage the full area of valve seat surface 70.

Piston 16 is disposed for reciprocating movement in piston cylinder 58 (FIGS. 1 and 7), which is connected to and forms a unitary assembly with core member 14.

As seen best in FIG. 6, piston 16 has a cylindrical configuration and comprises an annular ring 78 around its upper end, a skirt section 79, a peripheral groove 80, a reduced diameter top section 81, and a reduced diameter bottom end section 83 which is surrounded by and spaced from skirt section 79. Groove 80 accommodates an O-ring 84 having an outer diameter large enough for it to engage the inner surface of piston cylinder 58. The cross-sectional diameter of O-ring 84 is less than the axial dimension of groove 80, whereby groove 80 permits some limited axial movement of the O-ring along the piston. Sections 78 and 79 have the same outer diameter, which diameter is sized to provide a gap between those sections and the inner surface of cylinder 58 through which water can flow. The diameter of the upper portion 81 of piston 16 is significantly less than that of the remainder of piston 16 in order to facilitate the passage of water through the valve unit. The annular ring 78 around the upper portion of the piston has four inclined holes 86 which intersect with groove 80. Preferably, the axes of holes 86 make a small acute angle with the center axis of piston 16 as shown. The bottom end section 83 and skirt section 79 form a chamber for receiving a piston spring 88 (FIG. 1) which biases piston 16 upwardly so as to urge closure washer 72 tightly against valve seat 70. The lower end of spring 88 engages the bottom end wall 90 (FIG. 7) of piston cylinder 58.

Referring to FIG. 6, piston 16 has a center hole 92, which is threaded to receive retaining member 74, and has the previously mentioned counterbore 93 in its upper end to accommodate closure washer 72. The lower end of hole 92 is reduced in diameter, as shown at 95 and 96, and a cylindrical pin 97 extends through bore section 96. Pin 97 has a head 98 secured in the bottom end of bore section 95 and captivated by closure retaining member 74 so that it will move with the piston. Pin 97 continues downward and extends through a center hole 104 (FIG. 1) in a plug 100, which is screwed into a tapped center opening 102 (FIG. 7) in the bottom end of piston cylinder 58. A volume 278 (FIG. 1) is defined within piston cylinder 58 below piston 16. Volume 278 contracts or expands as piston 16 is reciprocated in cylinder 58. The hole 104 in plug 100 has a diameter slightly larger (approximately 1.0–1.5 mils larger) than that of pin 97 so that water can bleed into volume 278 below piston 16. A diametric slot 101 (FIGS. 1 and 2) in the top surface of plug 100 facilitates removal of plug 100 by a screw driver for maintenance or repair purposes. The upper end of hole 104 may be bevelled as shown to facilitate insertion of pin 97.

Turning now to FIGS. 1, 7, and 8, piston cylinder 58 is open at its upper end and has the aforementioned reduced-diameter center opening 102 in its lower end. It also has two inlet ports 106 near its upper end, and a mixing valve member 108 as an integral extension of its bottom end wall 90. Two diametrically-opposed interlock keyways in the form of slots 109 are provided in the upper end edge of cylinder 58.

Mixing valve member 108, when viewed from the bottom as depicted in FIG. 8, resembles the shape of an hourglass that has been cut in half. More specifically, it comprises opposed curved surfaces 107A and B that are mirror images of each other and are symmetrically spaced on opposite sides of the center axis of the cylinder.

As shown in FIG. 1, mixing valve member 108 engages the top ends of two identical hot and cold water orifice members 110A and 110B which are located in, and make a close fit in, bores 122A and 122B respectively (FIGS. 11 and 12) formed in the bottom portion of lower valve body 10. Each orifice member 110 has a groove around its middle to house a resilient O-ring 116. The O-rings 116 act as seals to prevent water from leaking around the orifice members. The bottom end of each orifice member has a transverse slot 118 through its diameter which intersects its axial bore 120.

Figure 10:
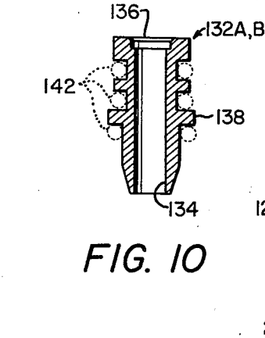
FIG. 10 is a sectional view in side elevation of one of the water supply connectors of the valve.

A ball check valve member 126 is located directly below each of the members 110A and 110B. Also located in bores 122A and B, below the two ball checks 126, are identical hot and cold water supply connectors 132A and 132B, respectively. The connectors make a close fit in bores 122A and B. As shown in FIGS. 1 and 10, each connector has three reduced diameter sections to accommodate three O-ring seals 142. Each connector 132 has a cylindrical bore 134 through its center which is counterbored and chamfered at its top end to provide a seat 136 for the associated ball 126. The connectors 132 have enlarged diameter sections 138 (FIG. 10) that are sized to engage shoulders 123 (FIG. 12) formed by counterbores 124A and B in the bottom end of bores 122A and B. Orifice members 110A and 110B are biased upward against mixing valve member 108 by two springs 130 (FIG. 1) which also engage and act against connectors 132A and B. Springs 130 have a diameter large enough to permit the balls 126 to move up and down in the spaces between the orifice members 110A, B and the water supply connectors 132A, B. The lowermost one of each set of O-rings 142 is engaged by a water supply collar 160 (FIG. 1) which has the shape of a short cylinder. Collar 160 has two circular hot and cold water openings 162 which are located and sized to accept and make a close fit with connectors 132A and B. Collar 160 also has counterbores concentric with openings 162 which are sized to accept water supply conduits 166A and B. Water supply conduits 166 are brazed to collar 160. Connectors 132A and B protrude into conduits 166A and B respectively. As shown in FIG. 1, collar 160 is secured to lower valve body 10 by a large flanged hexagonal nut 170, which screws onto an exterior screw thread 127 (FIG. 11) on the lower end of lower valve body 10, and forces collar 160 toward the bottom end of the lower valve body 10. Nut 170 is tightened enough to force the section 138 of connectors 132A and B against shoulder 123 of piston cylinder 58.

Figure 11:
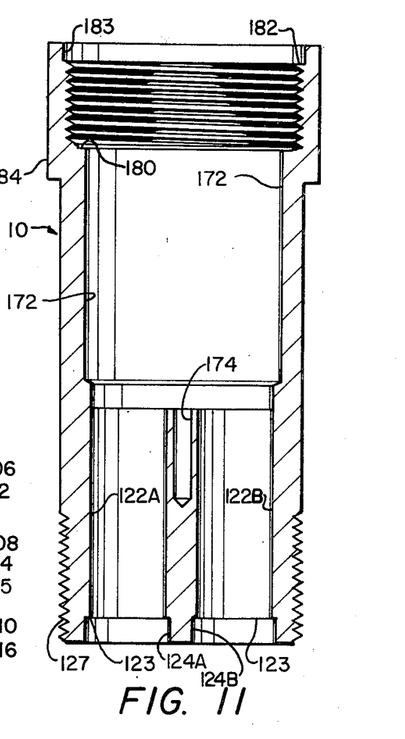
FIG. 11 is a sectional view in side elevation of the lower valve body.
Figure 12:
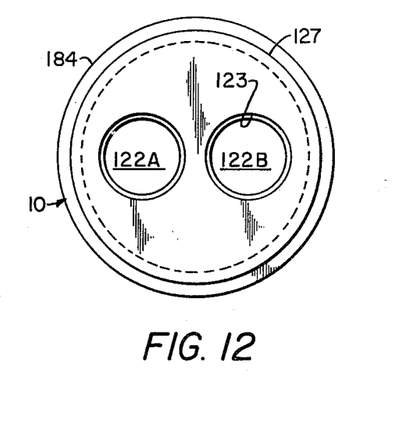
FIG. 12 is a bottom plan view of the lower valve body.

Turning now to FIGS. 1, 11, and 12, the lower valve body 10 is a cylindrical body having a hollow upper section with a cylindrical inner surface 172, and a lower section having the two eccentrically-located, parallel and cylindrical bores 122A and B, plus a smaller centrally-located blind hole 174 that slidably receives pin 97 when piston 16 is pushed down. The upper end of lower valve body 10 has a counterbore 180 which is threaded and forms a shoulder 182 with a second counterbore 183. The upper end of body 10 has an annular flange 184 (FIG. 11) that rests on a cylindrical extension 185 (FIG. 1) of valve support member 18. The extension 185 of support member 18 is threaded, while the lower portion forms a generally rectangular base 186 that provides the primary support for the automatic shut-off valve unit. Support member 18 is mounted to a lavatory sink surface 17 by two bolts (not shown) which pass through holes 188 in the support member and also through aligned holes (not shown) in the lavatory sink surface 17 and are secured in place by nuts (not shown). A gasket 190, is positioned between member 18 and sink surface 17. Lower valve body 10 is securely fastened to valve support member 18 by a large nut 192 which screws onto the extension 185 and has a flange 193 which overlaps the upper edge of lower valve body 10, so that when nut 192 is torqued down onto the threaded extension 185 of support member 18, flange 184 (FIG. 11) is captivated between nut flange 193 and support member 18. When piston cylinder 58 is positioned as shown in FIG. 1, a flow chamber 194 (FIG. 1) is defined by the outside surface of cylinder 58 and the inside surface 172 of lower valve body 10.

Figures 9, 13:
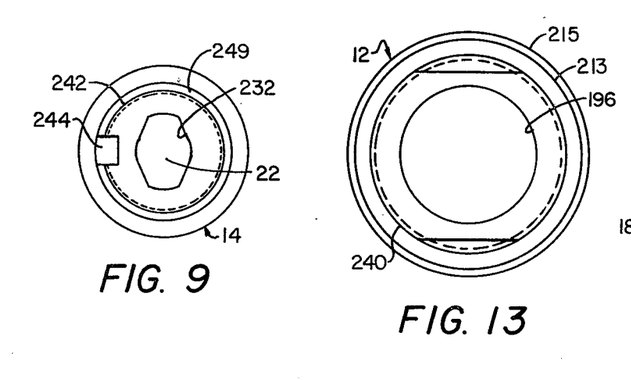
FIG. 9 is a top plan view of the core member.
FIG. 13 is a top plan view of the upper valve body of the same valve.
Figure 14:
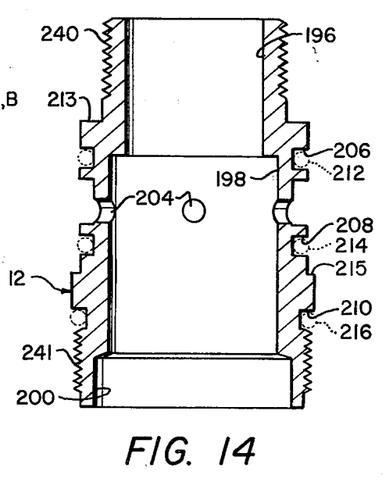
FIG. 14 is a sectional view in side elevation of the same upper valve body.

Turning now to FIGS. 1, 13, and 14, the upper valve body 12 has a cylindrical configuration. The outside surface of its upper end and its lower end are both threaded as shown at 240 and 241. The interior surface of upper valve body 12 is stepped so as to have three different diameter sections 196, 198 and 200. The upper portion of flow chamber 194 is defined by the inside surface 200 of upper valve body 12, the inside surface 172 of lower valve body 10, and the outside surface of piston cylinder 58. Four outlet holes 204 are formed in the section 198. Three annular grooves 206, 208 and 210 in the outside surface of body 12 accommodate O-rings 212, 214, and 216, respectively.

The threads 241 on the lower end of upper valve body 12 screw into the top end of lower valve body 10, and the threads 240 secure the lavatory faucet body 2 to the valve body 12 by mating with a hexagonal nut 218. A washer 220 and a rubber gasket 222 are clamped against a flange 213 of upper valve body 12 by a flange 217 on faucet body 2, so as to ensure that body 12 is secured to lavatory faucet body 2.

Turning now to FIGS. 1, 7, and 9, core member 14 is a hollow body of circular cross-section, which makes a snug rotatable fit inside upper valve body 12, and has two annular grooves 224 and 226 to accommodate like O-ring seals 228. The interior surface of core member 14 is stepped so as to have four sections 232, 234, 236 and 238. Section 232 defines hexagonal opening 22, while sections 234, 236 and 238 are cylindrical and of progressively greater diameter. Two outlets 239 pass through the side of core member 14 into the section 236. The lower end of section 236 is threaded as shown at 239A to allow valve seat member 34 (see FIG. 5) to be screwed into the lower end of core member 14 (FIG. 1). The outside upper surface of core member 14 is threaded as shown at 242 (FIG. 7) to accommodate a hexagonal nut 243 (FIG. 1). An axial keyway 244 is formed in the outside surface of the upper end of member 14 and extends downward a short distance below threaded portion 242. Two diametrically-opposed interlock keys in the form of extensions 245 (FIG. 7) project downward from the bottom end of core member 14 to mate with interlock keyway slots 109 in the upper end edge of piston cylinder 58. Extensions 245 and slots 109 are sized to allow piston cylinder 58 to move axially relative to core member 14 and to prevent cylinder 58 from rotating on its axis relative to core member 14. Thus rotation of core member 14 will cause cylinder 58 to rotate with it.

Figure 15:
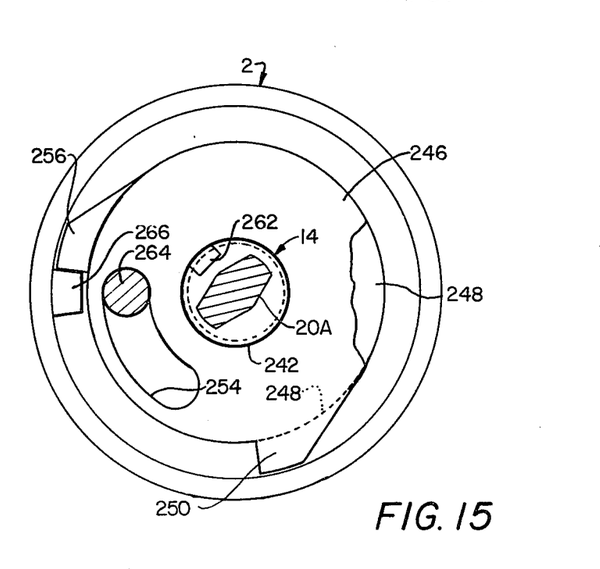
FIG. 15 is a cross-sectional view taken along line 15—15 of FIG. 1.

As shown in FIGS. 1 and 15, the upper portion of core member 14 is surrounded by an upper stop ring 246 and a lower stop ring 248. Upper ring 246 has a basically circular shape with a stop arm 250 projecting radially outward and a circular center opening that allows ring 246 to make a close fit around the upper portion of core member 14. Upper ring 246 also has a circularly-curved adjusting slot 254 near its outer edge. Lower ring 248 also has a basically circular shape with a stop arm 256 projecting radially outward. The inner edge of upper ring 246 is circular, except that it has a radially-extending key 262 (FIG. 15) that projects into keyway 244 (FIGS. 7 and 9), thereby preventing ring 246 from rotating relative to core member 14. The inner edge of ring 248 is circular. Near its outer edge, ring 248 has a threaded hole located below slot 254 to receive a screw 264 that passes through slot 254. Screw 264 limits relative rotation of rings 246 and 248 according to the length of slot 254. When the screw is tightened, its head clamps ring 248 to ring 246 so as to fix the angular spacing between arms 250 and 256. Stops 250 and 256 interact with a valve rotation limiter 266 (FIGS. 1 and 15) which projects inwardly from the inside upper surface of faucet casing 2 toward rings 246 and 248. Hexagonal nut 243 clamps rings 246 and 248 against a shoulder 249 (FIG. 7) on member 14.

Spout connector 6 is an annular ring which makes a tight fit around upper valve body 12 and is held tight against a flange 215 around the lower portion of upper valve body 12. Connector 6 also has a radial port 270 and an inclined counterbore 272 that intersects port 270. Spout 4 is secured in counterbore 272, e.g., by a threaded connection, and has an annular groove around its innermost end to accommodate a seal in the form of an O-ring 276.

Seals 212, 214 and 216 prevent leakage of water between upper valve body 12 and lower valve body 10 and spout connector 6, while seals 228 prevent leakage of water between core member 14 and upper valve body 12.

A description of the operation of the valve unit follows. The automatic shut-off cycle is initiated by pushing the valve operating handle 8 downward. This downward force is transmitted to the valve stem assembly 20 which travels downward and makes contact with the upper end 76 of closure retaining member 74. Continued downward force will move member 74 downward and cause closure washer 72 to break contact with the main valve seat surface 70. Since member 74 is screwed into the top of piston 16, the piston 16 is also pushed downward against the force of piston spring 88. Since there is no axial movement of piston cylinder 58, the volume 278 of cylinder 58 (below piston 16) is decreased as piston 16 travels downward. The water in volume 278 is forced out through the space between the piston and cylinder and the four relief passageways 86 and passes through the opening between closure washer 72 and valve seat surface 70. In this connection, it is to be noted that O-ring 84 always grips cylinder 58 and hence, as the piston moves down, it rises in groove 80 so as to permit water to flow upwardly into and through passageways 86. On the other hand, when piston 16 is moving upward, O-ring 84 moves down in groove 84 and prevents such flow. The portion of piston 16 below O-ring 84 makes a loose fit in piston cylinder 58, thereby providing room for the water in volume 278 to flow upwards and out through passageways 86 when the piston moves downward. When piston 16 is pushed downward, pin 97 also moves down into hole 174.

Once valve closure washer 72 is no longer seated against surface 70 of valve seat member 34, water from supply conduits 166 can flow through chamber 194, up through the valve unit, and out of faucet spout 4 as described below.

As seen in FIG. 1, cold water enters the valve unit via conduit 166B and supply connector 132B. It then flows past check valve ball 126 in bore 122B of lower valve body 10 and through orifice member 110B into flow chamber 194. Similarly, hot water flows into chamber 194 from conduit 166A through connector 132A, past check valve ball 126 in bore 122A of valve body 10, and through hot water orifice member 110A. Water from flow chamber 194 enters the inner volume of piston cylinder 58 through inlet ports 106 near the top of cylinder 58. There the water flows around the top of piston 16, past valve seat 70 of member 34 into counterbore 64 of valve seat member 34, through bore 60 and counterbore 62 of member 34, and into counterbore 42 of stem guide 32. The water then flows into spout 4 through four outlets 52 in the side of stem guide 32, through outlets 239 in the side of core member 14, through outlets 204 in the side of upper valve body 12, and finally through port 270 and counterbore 272 in the side of spout connector 6.

This main water flow path remains unobstructed and allows water to discharge from the valve unit through faucet spout 4, until piston spring 88 forces piston 16 upward to its original position and thereby reseats closure washer 72 against valve seat surface 70 of valve seat member 34. However, as piston 16 moves upward, the pressure in volume 278 below piston 16 decreases. Since piston O-ring 84 will not allow water from above piston 16 to flow downward into volume 278, the pressure in volume 278 can increase only via the entry of water through hole 104 in bottom plug 100. Because piston cylinder 58 is slidable axially relative to core member 14 and orifice members 110A and B are biased by springs 130, and also because the confronting surfaces of mixing valve member 108 and orifice members 110A and B are not perfectly smooth, water can flow between the top surfaces of orifice members 110 and the bottom of mixing valve member 108 into hole 104 at a rate suitable for restoring the piston 16 to its closed position in the manner hereinafter described. This flow continues as long as a differential pressure exists between the water in volume 278 and the water at the bottom of mixing valve member 108. Since pin 97 sits in hole 104, the rate of water flow is determined by the clearance between the diameter of hole 104 and the diameter of pin 97. Under normal water pressure conditions, a clearance of approximately 1.0–1.5 mils will allow a rate of water flow through hole 104 which will shut the valve unit after about 15–30 seconds of water discharge. When piston spring 88 has pushed piston 16 upward far enough for closure washer 72 to be seated against valve seat 70, water flow through the valve unit is terminated, and the valve unit is once again in position to begin another discharge and automatic shut-off cycle.

Temperature regulation of the discharged water is described below. Once valve handle 8 has been fully depressed, and the water flow path described above has been established, the ratio of hot-to-cold water discharged is controlled by the angular position of mixing valve member 108. As seen in FIG. 8, when the valve member 108 is rotated so that it is symmetrically positioned relative to the bores 120 in orifice members 110A and B, the effective sizes of those bores is approximately 50% of their actual size since they will be about ½ blocked by the mixing valve, with the result that hot and cold water will flow at equal rates (assuming equal hot and cold water supply pressures) past mixing valve member 108 into chamber 194. However, the symmetrical half hour-glass shape of mixing valve member 108 allows the bores 120 of orifice members 110A and 110B to be restricted more or less by rotation of member 108. Rotation of valve member 108 is effected by rotating valve operating handle 8 about its center axis in either a clockwise or counterclockwise direction. The spacing between stop arms 250 and 256 determines the extent of possible rotation. Due to the mating cross-section of upper stem section 20A and the matching opening 22 in core member 14, core member 14 will rotate with handle 8. As seen in FIG. 7, piston cylinder 58, being coupled to core member 14 by the two interlock extensions 245 and interlock slots 109, will rotate with valve handle 8 and core member 14. Depending on the direction of rotation, as cylinder 58 rotates, mixing valve member 108 will obstruct more of bore 120A and less of bore 120B, or less of bore 120A and more of bore 120B, whereby to vary the proportion of hot and cold water passing into the valve and thus change the temperature of the water discharged from spout 4. The stop arms 250 and 256 are preferably set so that when they are equidistant from limiter 266, the mixing valve member 108 will equally reduce the effective apertures of bores 120A and B.

The invention illustrated and described above has a number of advantages. First of all, it allows the hot and cold water to be mixed, as well as permitting the flow of water to be automatically terminated, each time the valve is operated. Additionally, the invention makes possible valves which are easy to manufacture, assemble and disassemble. In this connection, it is to be noted that the valve seat member 34 has a hexagonal bore 60 which facilitates its removal by means of a suitable wrench. Additionally, the V-shaped slot 101 in the plug 100 makes certain that some water may bleed into volume 278 through the center hole 104 in plug 100 even when the piston is at the end of its downward stroke and has engaged plug 100. The predetermined spacing between the pin 97 and the center hole 104 in plug 100 allows water to flow into volume 278 at a predetermined rate, thereby causing the piston 16 to move up against the valve seat member 34 at a rate determined by the force exerted by piston spring 88 and the rate at which water flows past pin 97. The check valve balls 126 are arranged so that water can always flow through the bores 120 via the slots 118, even when the balls 126 are held tight against members 110. The balls will move up off of the connector seats 136 whenever the water pressure in the water supply lines 166 is greater than the water pressure above the water supply connectors 132. When the valve is shut, the water pressure above supply connectors 132 tends to equalize with the pressure in the supply lines 166, and the balls 126 are pulled downward by the force of gravity so that the balls come to rest in the connector seats 136. The springs 130 maintain sufficient separation between the supply connectors 132 and the orifice members 110 to allow the balls 126 to clear the seats 136 so as to ensure adequate water flow through the valve unit. The position of ring 246 relative to ring 248 is easily adjusted by means of the screw 264. Access to the screw 264 is easily achieved by removing the handle 8 from the upper stem section 20A.

Figure 16:
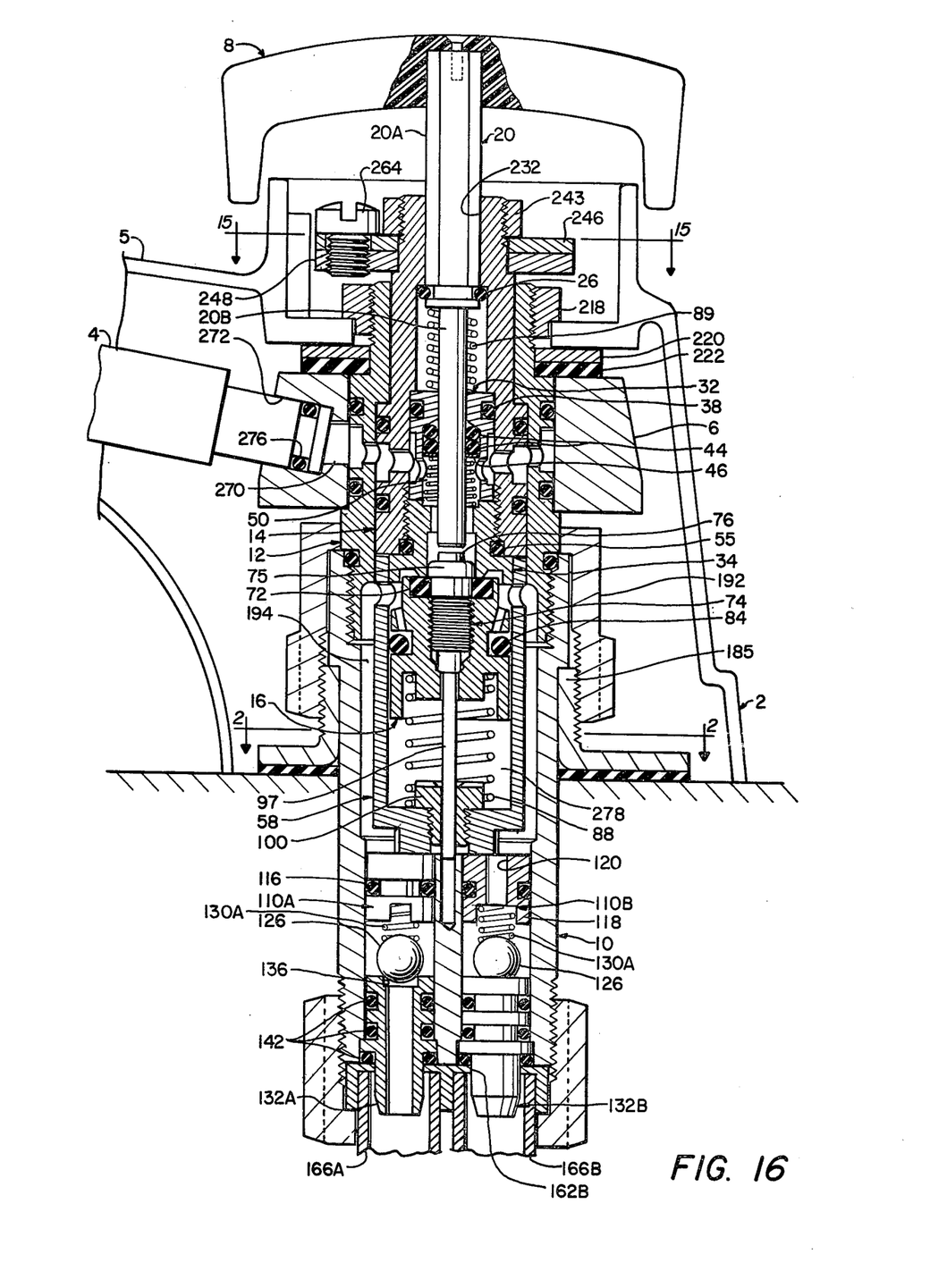
FIG. 16 is a sectional view in side elevation of a first modification of the automatic shut-off valve.

The invention also has the advantage that it is susceptible of various changes. FIG. 16 illustrates several possible modifications of the preferred embodiment of the automatic shut-off valve.

One modification shown in FIG. 16 relates to restoration of the handle and stem assembly to the at-rest position. On the valve shown in FIG. 1, when handle 8 is released, stem assembly 20 will be pushed back to its at-rest position by retaining member 74 as the piston 16 returns to its original position under the influence of spring 88. As an optional measure, an additional spring 89 may be provided as shown in FIG. 16 between the lower end of stem section 20A and stem guide 32, so as to cause the stem assembly and handle to return to the at-rest position independently of return movement of piston 16.

FIG. 16 also depicts modified lower compression springs 130A, located above ball check valve members 126 and arranged so as to provide a biasing force on balls 126 that holds them firmly against seats 136 of water supply connectors 132A and B (FIGS. 10 and 16), when the shut-off valve is in the shut position. This biasing force is required where the automatic shut-off valve is oriented so that the water supply connectors 132 are not vertical, but instead are inclined from the vertical attitude enough to prevent the force of gravity from adequately holding the balls 126 on seats 136 when the shut-off valve is in the shut position. Springs 130A also hold orifice members 110A and B against mixing valve member 108.

Figure 17:
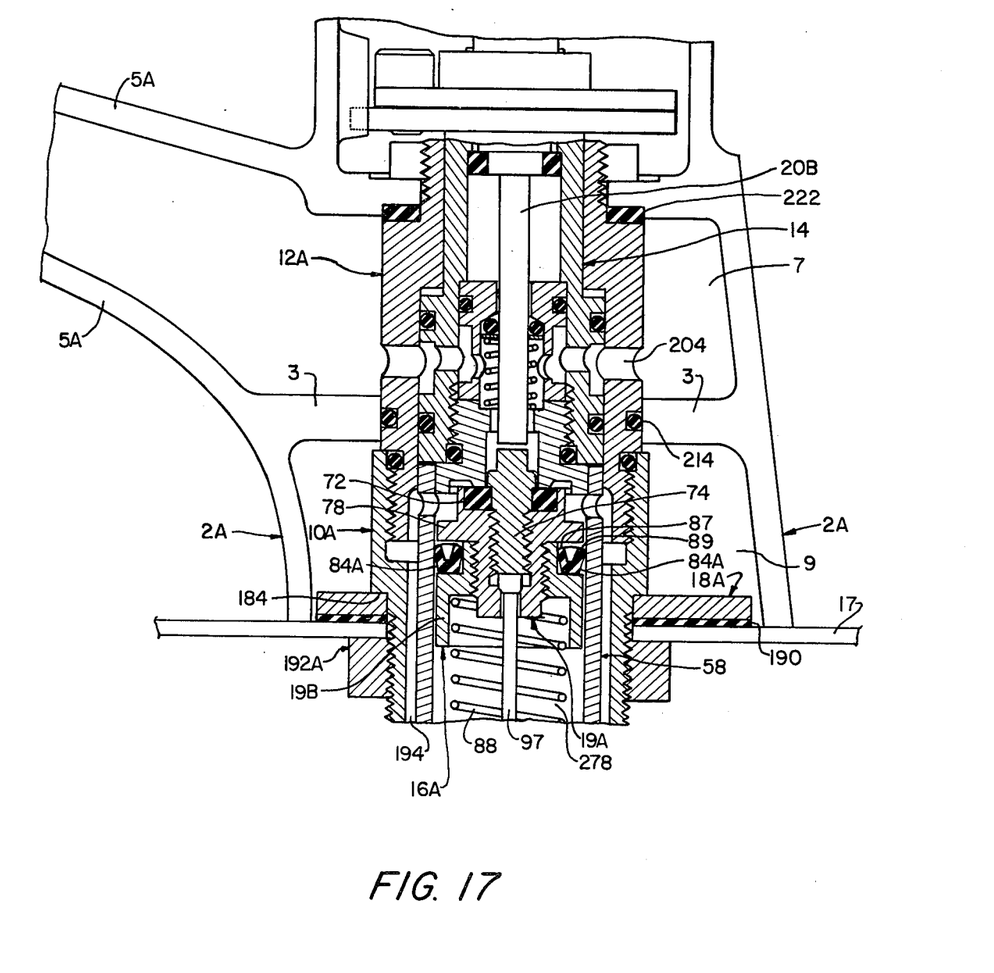
FIG. 17 is a fragmentary sectional view in side elevation of the middle portion of a second modification of the shut-off valve.

FIG. 17 illustrates some other possible modifications to the automatic shut-off valve. The faucet casing 2A has been modified so as to eliminate the need for a spout connector 6. In this case, casing 2A is arranged so as to form two chambers—an upper chamber 7 and a lower chamber 9. Chambers 7 and 9 are separated outside of the shut-off valve unit by a wall 3 that makes a tight fit with the outside surface of a modified upper valve body 12A and engages O-ring seal 214 positioned in an annular groove 208 in the outside surface of body 12A just below outlet holes 204, so as to prevent leakage between chambers 7 and 9 outside the valve unit. Upper valve body 12A is similar to upper valve body 12 in FIGS. 1, 14, and 16 with the exception that the flange 215 has been removed from body 12A and the lower portion of body 12A (from lower annular groove 210 down) has a smaller diameter than body 12. This reduced-diameter portion of body 12A is threaded to allow the lower end of body 12A to screw into the upper end of a modified lower valve body 10A.

In the modification of FIG. 17, the function of connector 6 is replaced by wall 3 and chambers 7 and 9. When the valve has been actuated, water flows through the valve in substantially the same manner as described above for FIG. 1. The water exits the valve unit through the upper valve body outlet holes 204 and enters upper chamber 7. Continued water flow causes the mixed water to flow through a modified casing spout section 5A to the user.

The embodiment of FIG. 17 also has modified piston assembly 16A wherein the piston comprises two portions 19A and 19B screwed together. Piston portion 19B has an outside groove in its upper end to accommodate an annular sealing member 84A having a cup-shaped cross-section. Piston portion 19A has a solid flange 78 which retains sealing member 84A in the groove of piston portion 19B. The axial dimension of the groove exceeds the corresponding dimension of sealing member 84A so as to allow the latter to shift axially relative to the piston. The upper piston portion 19A has a tapped hole to receive the closure retaining member 74 which maintains closure washer 72 in place in a groove in the upper piston portion. Upper piston portion 19A also has a hole in the center of its lower end for pin 97 much the same as the hole in the piston 16 shown in FIG. 1. Pin 97 is captivated by closure retaining member 74.

As noted previously, sealing member 84A is cup-shaped in cross-section. More particularly, sealing member 84A has a base section from which two thin pliable walls extend upward—an inner wall 87 that is inclined inward, away from the vertical plane and an outer wall 89 that is similarly inclined in the outward direction. Sealing member 84A is sized so that the upper ends of its inner and outer walls resiliently engage the confronting surfaces of piston portion 19B and cylinder 58. When the valve unit is actuated so as to push piston assembly 16A downward, water from volume 278 is forced upward around the piston assembly as the outer wall 89 bends inward enough to form a passageway between wall 89 and the inner surface of piston cylinder 58. However, as piston assembly 16A is moved upward by spring 88, wall 89 is forced outward so as to maintain a tight sealing contact with the inner surface of cylinder 58. Thus, as with O-ring 84 in FIG. 1, water can flow into volume 278 only through hole 104 (not shown in FIG. 17).

The automatic shut-off valve unit in FIG. 17 is attached to a sink 17 by a modified valve support member 18A in the form of a flat plate. A nut 192A is utilized in conjunction with member 18A to firmly fasten the valve unit to the lavatory sink surface 17. Nut 192A screws onto the outside threaded surface of modified lower valve body 10A from below the sink surface 17, while a shoulder 184 of body 10A rests on support member 18A just above the surface 17. The remainder of the shut-off valve unit is substantially the same, and operates in substantially the same manner, as the valve unit shown in FIG. 1.

Figure 18:
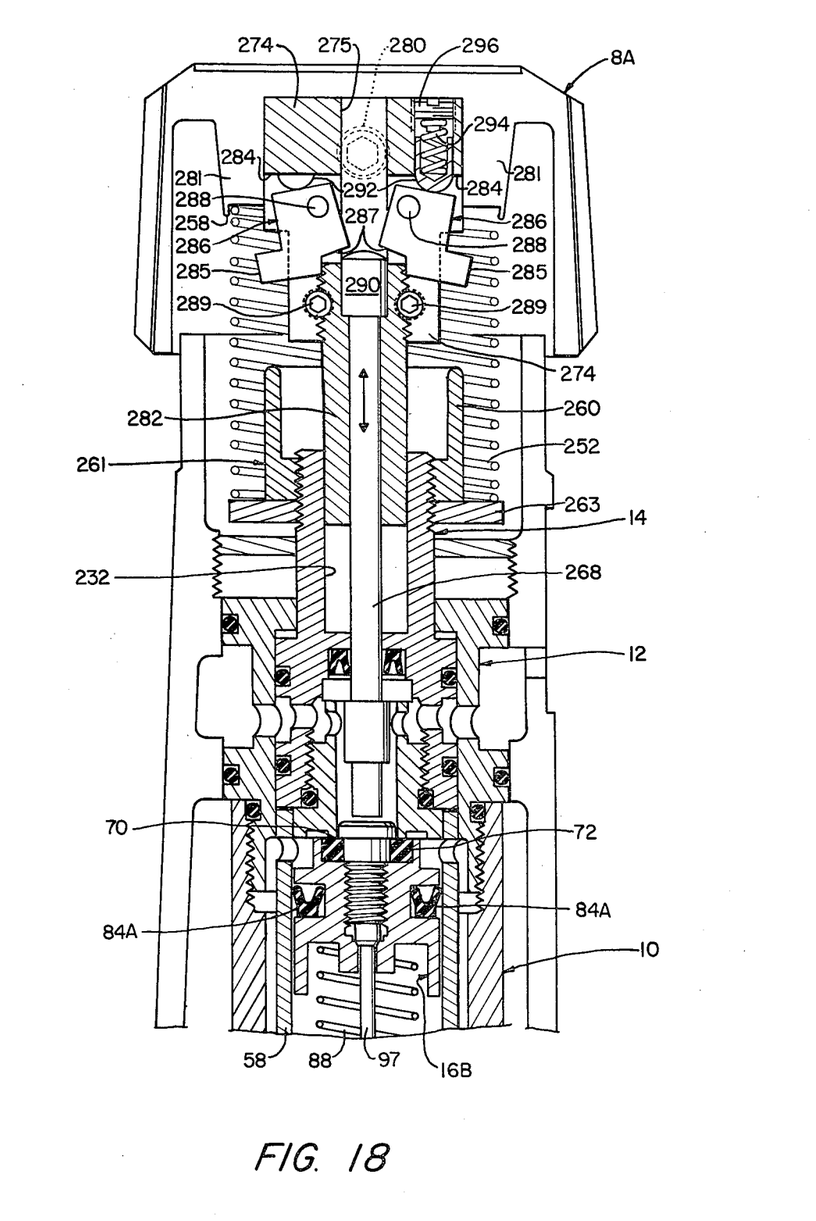
FIG. 18 is a fragmentary sectional view in side elevation of the upper half of a third modification of the automatic shut-off valve.

Turning now to FIG. 18, a modified shut-off valve is shown with a modified handle 8A, a valve handle spring 252, an actuator spindle 268, and means for disconnecting the handle 8A from the spindle 268 when the handle is depressed to a predetermined point. The disconnection means allows the actuator spindle 268 to return to its original position, ready for another water-dispensing cycle, while the handle 8A is still depressed and held down by the user. The disconnection means comprises a disconnect cylinder 274, a bottom-limit member 261, a sleeve 282, two latch members 286, and various other components described hereinafter.

The embodiment of FIG. 18 also includes a check nut 263, which is screwed onto the upper end of core member 14 and serves to retain the bottom end of the valve handle compression spring 252. Spring 252 functions to return valve handle 8A to its original position after the valve has been actuated, by depressing handle 8A, and then released. The upper end of spring 252 is retained by an annular lip 258 on the lower end of portion 281 of valve handle 8A.

The actuator spindle 268 is surrounded by a six-sided sleeve 282 whose upper end is screwed into a counterbore in the lower end of a bore 275 in disconnect cylinder 274. Sleeve 282 and cylinder 274 are also locked together by two set screws 289. Spindle sleeve 282 makes an axially-slidable fit in opening 232 of core member 14. Since the cross-sectional perimeter of sleeve 282 has substantially the same shape as that of the six-sided opening 22 (see FIG. 9), sleeve 282 does not rotate with respect to opening 22; instead, sleeve 282 and core member 14 rotate as a unitary member when the handle is rotated for the purpose of adjusting the water temperature.

Disconnect cylinder 274 is secured in a cylindrical depression in the bottom side of handle 8A by a set screw 280 located in a horizontal hole in a portion 281 of the handle. Cylinder 274 also has a central bore 275 which slidably accommodates spindle 268. Milled through the diameter of cylinder 274 is a slot 284 that extends upwardly from the bottom end of cylinder 274. Two latch members 286 are pivotally connected to cylinder 274 in slot 284 by pivot pins 288 that bridge the slot. As shown in FIG. 18, latch members 286 are symmetrically located about the central axis of cylinder 274. Each member 286 has a somewhat rectangular shape in profile, modified by a flange 285 projecting outward from the lower end and a recessed inclined surface 287 on the inner side of the lower end. Latch members 286 are held in position by two top guides 292 that exert a downward force on the top surface of members 286. Each guide 292 is bullet-shaped and is biased downward by a guide spring 294 that is connected to a slotted headless set-screw retainer 296 mounted in cylinder 274. When the latch members 286 are moved downward by handle 8A, the surfaces of recessed areas 287 make a sliding fit with a spindle head 290 integrally attached to the top end of actuator spindle 268. The upper surface of head 290 is convex as shown so that when latch members 286 are forced down onto head 290, the members 286 pivot about pins 288 as the surface of recessed areas 287 slides outward along the top surface of head 290. As handle 8A is pushed downward, latch members 286 also move downward until their flanges 285 make contact with the upper edge of a skirt 260 of a bottom-limit cylinder 261 screwed onto the upper threaded end 242 (see FIG. 7) of core member 14. The continued exertion of downward force on handle 8A causes the surfaces 287 of members 286 to slide across the rounded top surface of spindle head 290 as the innermost portions of members 286 continue to move downward. This motion causes members 286 to pivot about pins 288 (in FIG. 18, the member 286 shown on the left side of spindle head 290 would be caused to pivot in a clockwise direction, while the member 286 to the right of head 290 would be caused to pivot in a counterclockwise direction). The latching members 286 eventually will pivot enough to cause the surfaces 287 to slide past the outer edge of head 290, thereby disengaging the latch members 286 from the actuator spindle 268. This disengagement allows spindle 268 to return to its original uppermost position, even while handle 8A is kept in a depressed position, as spring 88 eventually returns piston 16B to its upwardly-biased position, thereby seating closure washer 72 against valve seat 70 and restoring the shut-off valve to its original (normally-shut) position. Even if the handle 8A is held in its fully downward position (limited by contact between latch members 286 and bottom-limit cylinder 261) by the user, the actuator spindle 268 is free to return to its original position by travelling up into bore 275 through the center of disconnect cylinder 274. The remainder of the automatic shut-off valve unit operates in substantially the same manner as described hereinbefore for the operation of the preferred embodiment shown in FIG. 1.

Still other modifications are possible. For example, the stop rings 246 and 248 and limiter 266 could be replaced by some other rotation limiting mechanism. Also, the plug 100 could be integrally attached to the lower end of piston cylinder 58, rather than being threaded so as to screw into center opening 102 in the bottom end of cylinder 58. It also is contemplated that the mixing valve member 108 could have some other shape and still function in substantially the same manner to vary the proportions of hot and cold water entering the chamber 194. A further possible modification is to detachably connect the bottom end of stem 20B to the closure member 74, e.g., by providing a tapped hole in member 74 into which lower stem section 20B may be screwed. In such an event, only one compression spring is required to cause the piston and stem assembly to return to the closed position when the handle is released.

Other modifications and advantages of the invention will be obvious to persons skilled in the art.

What is claimed is:

1. An automatic shut-off valve comprising in combination:
   a valve body having an upper end and a lower end, first and second inlet means in the lower end of said valve body for receiving hot and cold water supplied to said valve, said valve body having at least one outlet through which discharged water flows;
   a piston cylinder within said valve body, said cylinder having upper and lower ends;
   a piston slidably disposed within said cylinder and having a larger effective area at its bottom end than its top end;
   a spring arranged so as to urge said piston upward;
   a first passageway for leading hot and cold water from said inlet means to a first volume of said cylinder above said piston;
   a second passageway for leading hot and cold water from said inlet means to a second volume of said cylinder below said piston, said second passageway being arranged so that the rate of water flow into said second volume is a fraction of the rate of water flow via said first passageway into said first volume;
   a third passageway for passing water from said second volume to said first volume around said piston;
   means on said piston for substantially preventing flow of water from said second volume to said first volume via said third passageway when said piston is moving up in said cylinder;
   a valve opening for passing mixed water from said first volume to said at least one outlet;
   a valve seat in the upper end of said piston cylinder surrounding said valve opening;
   a valve closure member attached to the upper portion of said piston in position to engage said valve seat when said piston moves upwardly in said piston cylinder;
   a stem slidably attached to said valve body and arranged to engage and push said valve closure member down so as to open said valve opening;
   a valve operating handle attached to said stem to facilitate pushing said stem downward so as to open said valve opening; and
   adjustable valve means between said first and second inlet means and said cylinder for varying the proportion of hot and cold water delivered from said first and second inlet means to said first volume via said first passageway, whereby to control the temperature of mixed water discharged via said at least one outlet.

2. A valve according to claim 1 wherein said adjustable valve means comprises a mixing valve member attached to the bottom end of said piston cylinder and positioned directly above first and second orifices formed by said first and second inlet means, said mixing valve member being contoured so that as it is rotated it will simultaneously (a) increasingly block one orifice, and (b) increasingly unblock the other orifice, thereby changing the ratio of inlet hot and cold water to provide discharge water with a desired temperature.

3. A valve according to claim 1 wherein said second passageway comprises a hole in the bottom end of said cylinder and a pin attached to said piston and disposed in said hole, said pin being sized so that a small clearance is formed between it and the perimeter of said hole which serves as a bleed for conducting water through said hole into said second volume.

4. A valve according to claim 1, wherein said adjustable valve means comprises means attached to the bottom of said cylinder for inversely blocking and unblocking said first and second inlets as said cylinder is rotated relative to said valve body, and means for rotatably mounting said cylinder in said valve body.

5. A valve according to claim 4 wherein said stem is rotatable relative to said valve body, and further comprising:

means coupling said stem and cylinder so that said cylinder will rotate with said stem.

6. A valve according to claim 5 further including spring means urging said stem out of engagement with said valve closure member; and means for stopping upward movement of said stem by said spring means after said valve closure member has engaged said valve seat and said stem has been disengaged from said closure member 7. A valve according to claim 1 further including spring means urging said stem away from said piston.

8. An automatic shutoff valve comprising:

a valve body having first and second inlets for receiving hot and cold water and at least one outlet for discharging a mixture of hot and cold water;

a piston cylinder within said valve body, said cylinder having first and second opposite ends and being arranged so as to provide a first passageway between it and said valve body which communicates with said first and second inlets, said cylinder also having a hole at its second end communicating with said first and second inlets, and at least one side port communicating with said passageway;

an annular valve seat at said first end of said cylinder surrounding a discharge opening for passing water from said cylinder to said at least one outlet;

a piston slidably disposed within said cylinder, said piston having first and second opposite ends facing said first and second ends, respectively, of said cylinder, said piston being sized so as to provide a second passageway between it and said cylinder for flow of water from said hole to said discharge opening, said cylinder having a larger effective area at its second end than its first end;

a valve closure member attached to said first end of said piston and arranged so as to fully engage said valve seat and close off said discharge opening when said piston is moved toward said first end of said cylinder;

a peripheral groove in said piston;

at least one aperture in said piston leading from said groove to said first end of said cylinder;

an O-ring disposed in said groove, said groove and O-ring being sized so that said O-ring engages the inside surface of said cylinder and also so that it can move in said groove axially of said piston, whereby said O-ring will tend to move in said groove (a) toward said first end of said piston when said piston moves toward said second end of said cylinder and (b) toward said second end of said piston when said piston moves toward said first end of said cylinder, said O-ring effectively blocking said at least one aperture when it moves in said groove toward said first end of said piston;

a valve operating stem;

means slidably mounting said stem in coaxial relation to said valve closure member and said piston;

a piston spring urging said piston upward and away from said second end of said cylinder;

a handle attached to said stem for pushing said stem toward said closure member and said second end of said cylinder;

means on said valve closure member in position to be engaged by said stem and to cause said closure member to be moved by said stem away from said valve seat toward said second end of said cylinder, whereby water will flow from said first and second inlets to said at least one discharge opening via said first passageway;

a pin attached to said piston and projecting into said hole in said cylinder, said pin being undersized relative to said hole so as to provide a bleed passageway therebetween whereby water may flow from said first and second inlets into the space between said piston and said second end of said cylinder, whereby after said piston has been moved so as to disengage said valve closure member from said valve seat and said stem has been disengaged from said piston, flow of water into said space via said bleed passageway will gradually cause the piston to be hydraulically forced to move said valve closure member into flowblocking engagement with said valve seat;

means rotatably mounting said cylinder in said valve body; and valve means on said cylinder for inversely blocking and unblocking said first and second inlets, respectively, as said cylinder is rotated relative to said valve body, whereby to vary the mixture of hot and cold water passing from said inlets to said at least one outlet.

9. A valve according to claim 8 wherein said valve body comprises a first upper section and a second lower section mated together by a screw thread connection, and further wherein said at least one outlet is formed in said first upper section and said first and second inlets are in said second lower section.

10. A valve according to claim 9 further including a valve spout communicating with said at least one outlet by means removably attached to said upper valve body.

11. A valve according to claim 10 wherein said first and second inlets comprise first and second separately formed members disposed in said second lower section of said valve body.

12. A valve according to claim 9 further including a hollow core member rotatably disposed in said first upper section of said valve body, and further wherein said cylinder is attached to said core member in spaced relation to said second lower section of said valve body.

13. A valve according to claim 12 further including a valve stem guide mounted within said hollow core member, and means for preventing rotation of said valve stem relative to said hollow core member while permitting axial movement of said stem relative to said hollow core member.

14. A valve according to claim 13 wherein said valve seat is part of a separately formed member which is mounted within said core member.

15. A valve according to claim 14 wherein said separately formed member is screwed into said core member.

16. A valve according to claim 8 wherein said stem is rotatable relative to said valve body, and further including means for causing said cylinder to rotate with said stem, and means for limiting rotation of said valve stem relative to said valve body.

17. A valve according to claim 16 wherein said means for limiting rotation comprises first means rotatable with said valve stem and second means fixed with respect to said valve body.

18. A valve according to claim 17 further including a housing surrounding and attached to said valve body, said second means being attached to said housing.

19. A valve according to claim 17 wherein said first means comprises a first disk having a first stop member engagable with said second means, a second disk having a second stop member engagable with said second means, and means releasably locking said first and second disks to one another.

20. A valve according to claim 9 wherein said first and second inlets comprise first and second separately formed orifice members removably positioned within said second lower section of said valve body.

21. A valve according to claim 8 further including a housing surrounding said valve body, a faucet spout within said housing, and means connecting said faucet spout to said at least one outlet.

22. A valve according to claim 8 further including means for disengaging said valve operating handle from said valve operating stem when said handle has been depressed to a predetermined bottom-limit position, whereby said stem is free to return to its initial position independent of whether or not said handle has returned to its original upwardly position.

23. A valve according to claim 22 wherein said disengaging means comprises in combination:
- a first member connected to the bottom side of said valve operating handle and having a lower end and an upper end, said member having a diametric slot in said lower end with two latch members pivotally mounted within said slot;
- a spindle sleeve surrounding said stem and having an upper end and a lower end, said lower end being slidably mounted in the upper end of said valve body, and said upper end of said sleeve being securely attached to said member;
- a valve handle spring located between said valve handle and the upper end of said valve body so as to bias said handle upward and away from said valve body; and
- a second member fastened to said valve body and positioned so as to coact with said latch members, whereby when said valve handle is depressed so as to cause said latch members to engage and depress said stem, said latch members will pivot so as to disengage said stem and allow said stem to return to its original position.

24. An automatic shutoff valve comprising:
- a valve body having first and second inlets for receiving hot and cold water and at least one outlet for discharging a mixture of hot and cold water;
- a piston cylinder within said valve body, said cylinder having first and second opposite ends and being arranged so as to provide a first passageway between it and said valve body which communicates with said first and second inlets, said cylinder also having a hole at its second end communicating with said first and second inlets, and at least one side port communicating with said passageway;
- an annular valve seat at said first end of said cylinder surrounding a discharge opening for passing water from said cylinder to said at least one outlet;
- a piston slidably disposed within said cylinder, said piston having first and second opposite ends facing said first and second ends, respectively, of said cylinder, said piston being sized so as to provide a second passageway between it and said cylinder for flow of water from said hole to said discharge opening, said cylinder having a larger effective area at its second end than its first end;
- a valve closure member attached to said first end of said piston and arranged so as to fully engage said valve seat and close off said discharge opening when said piston is moved toward said first end of said cylinder;
- a peripheral groove in said piston;
- a resilient sealing member in said groove arranged so as to (a) allow flow of water past said piston when said piston is displaced toward said second end of said cylinder and (b) block flow of water past said piston when said piston moves toward said first end of said cylinder;
- a valve operating stem;
- means slidably mounting said stem in coaxial relation to said valve closure member and said piston;
- a piston spring urging said piston upward and away from said second end of said cylinder;
- a handle attached to said stem for pushing said stem toward said closure member and said second end of said cylinder;
- means on said valve closure member in position to be engaged by said stem and to cause said closure member to be moved by said stem away from said valve seat toward said second end of said cylinder, whereby water will flow from said first and second inlets to said at least one discharge opening via said first passageway;
- a pin attached to said piston and projecting into said hole in said cylinder, said pin being undersized relative to said hole so as to provide a bleed passageway therebetween whereby water may flow from said first and second inlets into the space between said piston and said second end of said cylinder, whereby after said piston has been moved so as to disengage said valve closure member from said valve seat and said stem has been disengaged from said piston, flow of water into said space via said bleed passageway will gradually cause the piston to be hydraulically forced to move said valve closure member into flowblocking engagement with said valve seat;
- means rotatably mounting said cylinder in said valve body; and
- valve means on said cylinder for inversely blocking and unblocking said first and second inlets, respectively, as said cylinder is rotated relative to said valve body, whereby to vary the mixture of hot and cold water passing from said inlets to said at least one outlet.

* * * * *